Jan. 27, 1953 E. E. TALIAFERRO 2,626,498
COTTON-PICKING MACHINE
Filed April 22, 1949
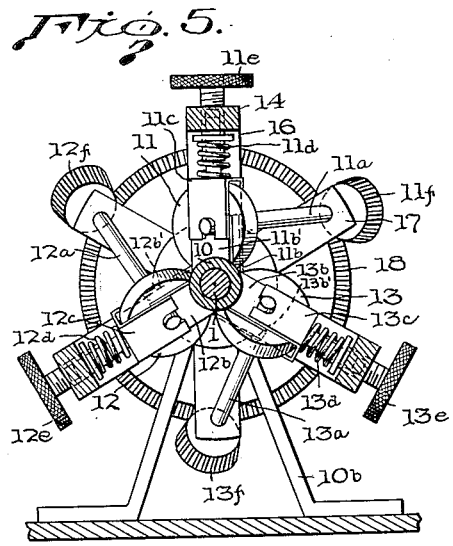
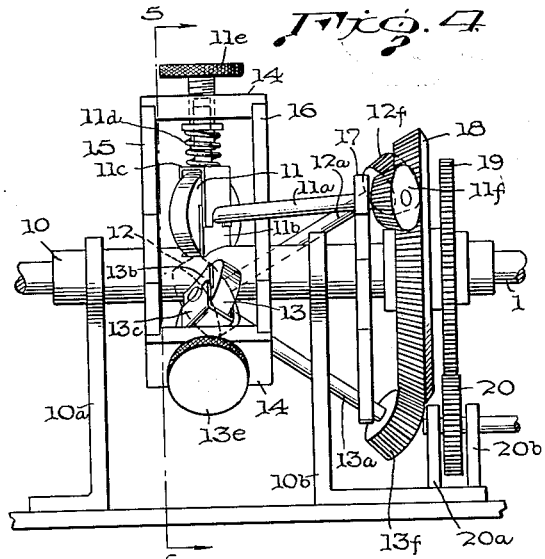
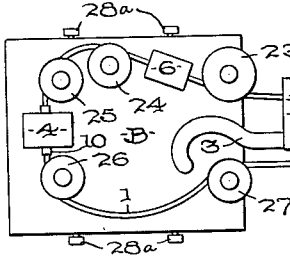
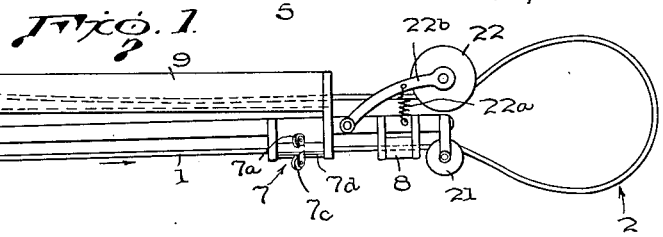
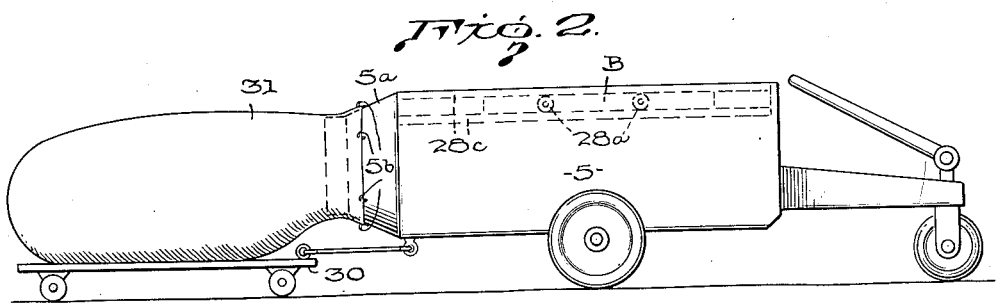
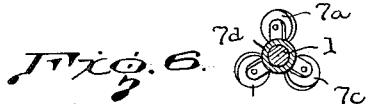
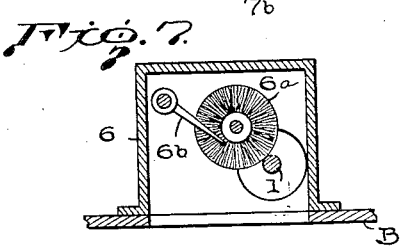
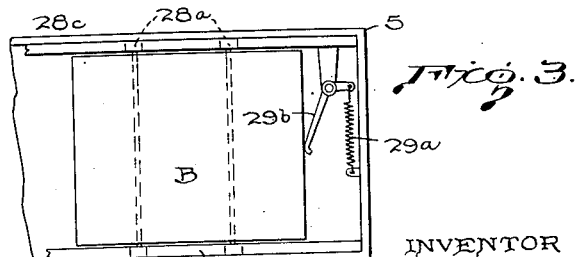
INVENTOR
EDWARD E. TALIAFERRO
By Ralph B. Stewart
ATTORNEY Patented Jan. 27, 1953

2,626,498

UNITED STATES PATENT OFFICE 2,626,498

COTTON-PICKING MACHINE

Edward E. Taliaferro, Jackson, Tenn.

Application April 22, 1949, Serial No. 88,985

9 Claims. (Cl. 56—36)

This invention relates to cotton picking machines and in particular to a machine utilizing an individually directed picker comprising a rotating and advancing endless cable.

Although machines have been proposed which have dirigible or individually directed pickers, some of them utilizing endless belts, a common fault in these machines has been the bulky, unwieldy means for conveying the cotton from the picker to the sack or other collecting and storing container. The operation of these machines has not been practical or satisfactory due to this unwieldiness; the operator, in many cases, not being able to pick as many bolls as a single man working by hand.

A primary object of the invention is to provide a light, easily maneuvered, individually directed cotton picker.

Another object of the invention is to provide a cotton picker having novel means for picking the boll from the plant and conveying it to the collecting container.

Still another object is to provide novel means for maintaining the picking loop at the proper size.

A further object is to provide novel mounting means for the cotton picking apparatus to effect a greater degree of flexibility in use.

Yet another object is to provide easily replaceable means for the storage of picked cotton.

One embodiment of my invention is illustrated in the accompanying drawing in which:

Figure 1 is a plan view of the picker assembly embodying the endless cable;

Figure 2 is a side elevation on a reduced scale of a wheeled cart for carrying the picker as shown in Figure 1 and showing a trailer for supporting a cotton storage bag;

Figure 3 is a plan view of the forward part of the cart showing a movable board on which parts of the picker assembly are supported, the picker parts being omitted in this figure;

Figure 4 is a side elevational view of one arrangement for rotating the picking cable and simultaneously advancing it.

Figure 5 is a sectional view of Figure 4 taken along the line 5—5.

Figure 6 is an end view of the booster pulley assembly; and

Figure 7 is an end view of one suitable form of doffer arrangement.

Referring to the drawings, an endless, resilient flexible cable 1 having a portion formed into a loop 2 is guided by a directing member 3. Each linear section of this cable is simultaneously rotated about its own axis and advanced along this axis by a driving mechanism 4 mounted on a base board B carried by a cart 5, and if the loop portion 2 is touched to a boll of cotton, the cotton from the open boll will be wrapped around the linear section forming loop 2 of the cable and will be carried along until it is removed from the cable by doffing mechanism 6, also mounted on the board B. Booster pulleys 7 serve to maintain the loop 2 at the proper size, and moisture box 8 moistens the cable 1 just prior to the loop portion 2 for more effective operation in removing the cotton from the open boll. Shield 9 protects the cotton which has been removed from the plant as it is being conveyed by the cable to the doffer 6.

The directing member 3 is a long, slender, easily maneuvered staff which may take the shape of an ordinary walking cane if desired. Guide pulley 21 is mounted at one end of the staff and a larger guide pulley 22 is mounted in the same plane as pulley 21 but on the opposite side of the staff. Pulley 22 is mounted on the end of arm 22b which is pivotally attached to the staff and biased toward the staff by means of spring 22a. The cable 1 runs out one side of the staff over pulley 21, loops around to form the picking loop 2 and returns under pulley 22 and along the other side of the staff to a guide pulley 23 mounted on board B. Additional guide pulleys 24, 25, 26 and 27 are mounted on board B for guiding the cable 1 through a second loop at the rear end of the staff 3, the portion of the cable forming the second loop being guided from one unit to another and their number and location may be varied to suit the requirements of the particular layout of units employed. The internal tension of the cable in the loop portion 2 balances the tension of spring 22a and the pulley 22 is free to ride over cotton that is wrapped around the cable. In order to protect this cotton wrapped around the cable, a sleeve 9 formed of light weight material is provided around the returning portion of the cable and is attached to the staff.

One suitable arrangement of driving mechanism 4 is shown in detail in Figures 4 and 5. The cable 1 passes through a tubular member 10 mounted on supports 10a and 10b. Disposed between the supports 10a and 10b and spaced equidistantly about tubular member 10 are three driving wheels 11, 12 and 13. The axes about which these wheels rotate are arranged at an angle to the axis of the cable 1 as it passes through tubular member 10 and the wheels themselves extend through openings formed in tubular member 10 and engage the cable 1. Shafts 11a, 12a, 13a are attached to driving wheels 11, 12, 13 and extend through radial slots formed in brackets 11b, 11b', 12b, 12b', 13b, 13b' which are mounted on tubular member 10 on either side of wheels 11, 12, and 13 respectively. In order to apply pressure to the driving wheels, U-shaped saddles 11c, 12c, 13c are provided which straddle the wheels and the brackets mounted on either side thereof and bear upon the shafts 11a, 12a, 13a. Each arm of the saddles is provided with a bearing element for the shaft, and in the construction shown in the drawing the bearing element is formed as a slot in the end of each arm having a rounded bottom engaging the shaft.

Pressure is applied to the saddles through springs 11d, 12d, 13d which may be compressed by thumbscrews 11e, 12e, 13e threaded through yokes 14 mounted between the arms of two 3-armed spider support members 15 and 16. These spiders 15 and 16 are mounted on the tubular member 10 on either side of the driving wheel assembly and with the arms in alignment. The saddles 11c, 12c and 13c are maintained in position by means of mounting stems secured to the yoke of each saddle and extending radially outwardly through the compression springs and into center bores formed in screws 11e, 12e and 13e. Thus the wheels 11, 12 and 13 may move radially to follow any irregularities in the size of cable 1.

A third spider 17 is spaced some distance from spider 16, preferably on the opposite side of support 10b and with the arms in such a position as to act as bearing supports for the opposite ends of shafts 11a, 12a, 13a from the driving wheels 11, 12, 13. The ends of the shafts that are supported by spider 17 are provided with pinions 11f, 12f, 13f which mesh with ring gear 18. Ring gear 18 is rotatably mounted on tubular member 10 and concentrically mounted therewith on the same hub is spur gear 19. Carried by fixed brackets 20a, 20b, which may be attached to support 10b, is a smaller spur gear 20 which meshes with gear 19. Gear 20 is connected to a suitable power source, which may also drive cart 5, and drives ring gear 18 through gear 19, thereby causing wheels 11, 12, 13 to rotate. Due to their angular position with respect to cable 1, these wheels not only cause cable 1 to rotate about its own axis but also simultaneously cause it to be moved through tubular member 10. The angular position of the wheels 11, 12, 13 and their speed of rotation is preferably arranged so that each linear section of the cable will be rotated about its axis approximately 400 revolutions per minute and advanced along the circuit or orbit of the cable at a speed of approximately twenty-three feet per minute. If desired, the shafts and gearing shown may be replaced by ordinary spur gears and flexible shafts; or the pinions and ring gear may be replaced by a conical friction drive.

The cable 1 may be constructed by any of several methods which result in a flexible cable having sufficient torsional rigidity and lateral stiffness to maintain the loop portion 2 self sustaining. For example, the construction utilized in many flexible power shafts and instrument drives using coiled steel wire would be suitable, and if desired the cable could be covered with vulcanized rubber or other suitable flexible material such as synthetic plastic material.

In order to maintain the loop 2 at the proper size the outgoing portion of the cable runs through a short tubular member 7d attached to the staff 3 near the outer end. This tubular member is similar to tubular member 10 of the driving mechanism and has three booster pulleys 7a, 7b, 7c mounted on it in a manner similar to pulleys 11, 12, 13 of the driving mechanism. The torsional rigidity of the cable causes these pulleys to be rotated and they in turn pull the cable through the tubular member 7d at the same speed that the cable is pulled through the driving mechanism, thereby maintaining the loop 2 at the proper size. Figure 6 is an end view of the booster pulley assembly.

The moisture box 8, as previously mentioned, is mounted on the staff between the booster pulleys and pulley 21 and serves to moisten the cable before it reaches the picking loop and thereby enhances the ability of the cable to pick the cotton from the open boll. It will be understood that the moisture box 8 includes known means for moistening the surface of the cable 1 such as absorbent material saturated with water and having contact with the cable within the box 8.

The doffing mechanism 6, which removes the cotton that has been wrapped around the cable may be of any known construction, such as that shown in Figure 7 where a rotary brush 6a brushes the cotton fibers from the cable 1, and a comb 6b combs the fibers from the brush 6a. The fibers then pass through an opening in board B and accumulate in the body of the cart 5. If desired, two or three rotating brushes may be disposed about the cable 1 for more efficient removal of the cotton fibers.

The operation of the picker is as follows: The driving wheels 11, 12 and 13 of the driving mechanism 4 engaging the cable 1 at one point in its circuit or orbit, causes each linear section of the cable to rotate about its own axis simultaneously with all other linear sections, the driving mechanism 4 also causes each linear section of the cable simultaneously to advance along the circuit or orbit of the cable. In the example given above each linear section of the cable is rotating about its own axis at approximately 400 revolutions per minute and is advanced about the circuit of the cable approximately 23 feet per minute. Each linear section of the cable in passing through the moisture box 8 has moisture applied thereto before it enters the picking loop 2, and if any portion of the picking loop 2 is brought into contact with cotton fiber in an open boll, the fiber is wrapped around the section of the cable in loop 2 and is carried around this loop and through the sleeve guard 9 back to the doffing device 6 where it is removed from the cable and drops through the opening in the board B below the doffing device. It will be understood that since the picking loop 2 is carried at the outer end of the movable staff 3, the operator of the machine may direct the picking loop in any desired direction to pick cotton from any location on the plant.

The cart 5 is preferably power driven (as by a gasoline engine) and to enable efficient use of the picker, the board B carrying the doffer and driving mechanism is mounted on rollers 28a which roll in tracks 28c, disposed horizontally along both sides of the cart 5. The board B is normally biased to a rearward position by a spring 29a attached to one leg of a bell crank 29b, the other leg of the bell crank engaging the edge of board B. This arrangement allows the operator of the picker a considerably wider range of movement than if the driving mechanism was mounted at a fixed location in the cart. This increased range of movement is helpful as the cart moves along the rows of plants at a uniform rate of speed, whereas the time required to pick all the bolls from various plants will vary greatly.

In order to increase the capacity of the cart 5, a small wheeled trailer 30 is provided behind the cart to support the usual cotton bag 31. The rear end of the body of the cart is formed as an open-ended funnel-shaped portion 5a and the mouth of the bag may be slipped over the funnel portion and secured by means of hooks 5b. The trailer is towed from cart 5 by any suitable connection. The cotton contained in the cart may be pushed manually through the portion 5a into the bag 31 or it may be conveyed automatically from the cart into the bag by known devices.

For the purpose of increasing the driving friction between the cable and driving wheels 11, 12 and 13 and the booster wheels, these wheels may be provided with tires or rims formed of rubber or other suitable material.

What I claim is:

1. In a cotton picking machine, the combination of a picking element comprising an endless, resilient cable, means operatively associated with said cable for supporting said cable for movement linearly thereof through the closed circuit of said cable, a portion of said cable being formed as a self-sustaining picking loop, driving means operatively associated with said cable for driving said cable continuously through said circuit and for simultaneously rotating said cable about its own axis, whereby all linear sections of said cable pass through said loop in succession, and doffing means operatively associated with said cable for removing cotton from said cable as it leaves said loop.

2. In a cotton picking machine, the combination of a picking element comprising an endless, resilient cable, means operatively associated with said cable for supporting said cable for movement linearly thereof through the closed circuit of said cable, a portion of said cable being in the form of a self-sustaining picking loop, and driving means operatively associated with said cable for rotating each linear section of said cable about its own axis and for simultaneously moving it about said circuit.

3. A cotton picking machine according to claim 1 wherein said picking element is provided with a smooth picking surface and including moistening means arranged to moisten said picking surface before said cable enters said loop.

4. A cotton picking machine according to claim 1 wherein said cable-supporting means includes a dirigible staff, said cable being supported upon said staff with the picking loop of said cable extending from one end of said staff.

5. A cotton picking machine according to claim 1 wherein said cable-supporting means includes a dirigible staff, said cable being supported upon said staff with the picking loop of said cable extending from one end of said staff, and the adjoining portions of said cable, extending from the two sides of said loop, being supported in parallel relation along the length of said staff, the remainder of said cable being formed in a second loop extending from the other end of said staff, and said driving means being arranged in driving relation to said second loop.

6. A cotton picking machine according to claim 5 and including a shield attached to said staff and surrounding the portion of said cable traveling between said picking loop and said doffing means.

7. A cotton picking machine according to claim 4 in which said means for forming said cable into a picking loop comprises two pulleys mounted on opposite sides of said end of said staff, one of said pulleys being mounted with its axis in fixed relation to said staff and the other of said pulleys being mounted on an arm pivotally attached to said staff and biased toward said staff by spring means.

8. A cotton picking machine according to claim 2 and including means for maintaining said picking loop of constant size comprising three idler pulleys disposed about the circumference of said cable and engaging said cable with their axes of rotation at an angle to the axis of rotation of said cable.

9. A cotton picking machine according to claim 1 in which said driving means comprises a plurality of driven wheels disposed about and engaging the circumference of said cable and with the axes of rotation of said wheels at an angle to the axis of rotation of said cable.

EDWARD E. TALIAFERRO.

REFERENCES CITED

The following references are of record in the file of this patent:

UNITED STATES PATENTS

| Number | Name | Date |
|---|---|---|
| 13,877 | Howe | Dec. 4, 1855 |
| 1,103,622 | O'Shaugnessy | July 14, 1914 |
| 1,999,051 | Kennedy | Apr. 23, 1935 |
| 2,085,046 | Rust et al. | June 29, 1937 |
| 2,135,675 | Palmer | Nov. 8, 1938 |
| 2,198,695 | Cummings | Apr. 30, 1940 |
| 2,433,083 | Baker et al. | Dec. 23, 1947 |